United States Patent [19]

Regalbuto et al.

[11] Patent Number: 4,585,374

[45] Date of Patent: Apr. 29, 1986

[54] HIGH ENERGY FORMED CONNECTIONS

[75] Inventors: John A. Regalbuto, Fort Worth; James E. Dailey, Houston, both of Tex.

[73] Assignees: Jet Research Center Inc., Arlington; Brown & Root, Inc., Houston, both of Tex.

[21] Appl. No.: 143,563

[22] Filed: Apr. 25, 1980

Related U.S. Application Data

[63] Continuation-in-part of Ser. No. 65,494, Aug. 16, 1979, abandoned.

[51] Int. Cl.$^4$ .................. E02B 17/00; B23P 11/00
[52] U.S. Cl. .................. 405/227; 29/421 E; 29/523; 285/382.4
[58] Field of Search .............. 405/170, 195, 227, 232; 29/421 E, 523; 166/55.1; 175/4.51; 285/382.4, 382.5

[56] References Cited

U.S. PATENT DOCUMENTS

| | | |
|---|---|---|
| 2,367,206 | 1/1945 | Davis . |
| 2,779,279 | 1/1957 | Maiwurm . |
| 3,137,937 | 6/1964 | Cowan et al. . |
| 3,140,537 | 7/1964 | Popoff . |
| 3,160,949 | 12/1964 | Bussey et al. . |
| 3,206,845 | 9/1965 | Crump . |
| 3,224,204 | 12/1965 | Siebenhausen .............. 405/227 |
| 3,263,323 | 8/1966 | Maher et al. . |
| 3,264,731 | 8/1966 | Chudzik . |
| 3,432,192 | 3/1969 | Ito et al. . |
| 3,434,194 | 3/1969 | Whittaker et al. . |
| 3,492,824 | 2/1970 | Evans et al. .............. 29/421 E X |
| 3,540,224 | 11/1970 | Pogonowski .............. 405/227 |
| 3,555,831 | 1/1971 | Pogonowski . |
| 3,572,768 | 3/1971 | James . |
| 3,661,004 | 5/1972 | Lee et al. . |
| 3,710,434 | 1/1973 | Daniels et al. . |
| 3,720,069 | 3/1973 | Lockridge . |
| 4,158,388 | 6/1979 | Owen et al. .............. 175/4.51 X |
| 4,180,349 | 12/1979 | Van Bilderbeek .............. 405/224 |
| 4,184,790 | 1/1980 | Bassett .............. 405/227 |

Primary Examiner—David H. Corbin
Attorney, Agent, or Firm—Thomas R. Weaver

[57] ABSTRACT

Method and apparatus for the joining of one tubular member to another tubular member through the use of the substantially instantaneous application of high energy to the tubular members, such as by the use of explosives, while placing one tubular member in a state of substantially elastic deformation and the other tubular member in a state of substantially plastic and elastic deformation.

39 Claims, 6 Drawing Figures

HIGH ENERGY FORMED CONNECTIONS

This application is a continuation-in-part of our prior co-pending application Ser. No. 65,494, filed Aug. 16, 1979, now abondoned; the subject matter disclosed in said prior application which is also disclosed in this continuation-in-part application is incorporated herein by reference and such common subject matter is entitled to the benefit of the filing date of said prior application.

This invention relates to high energy formed connections for use in marine structures.

Marine structures are used for a wide variety of purposes and their design and construction are generally well known in the art. Typically, marine structures are used in the exploration and production of hydrocarbons throughout the various marine environments of the world.

Generally, a marine structure utilized for the exploration and production of hydrocarbons comprises an underwater portion, which is often characterized as a jacket and is fabricated as a framework of tubular members, a plurality of piles driven into the floor of the body of water on which the marine structure is located to provide support for the marine structure, thereby acting as the foundation of the marine structure, and a deck section set on top of the jacket after the plurality of piles have been secured to the jacket.

In the marine structure the jacket fulfills a dual purpose. The jacket serves as a template or guide through which the piles are driven into the earth and then, after the piles are driven and secured to the jacket, the jacket provides a strong framework to transmit and distribute loads imposed on the structure as a whole to the piles which acts as the foundation for the marine structure.

In shallow water depths, main piles driven through the jacket legs are normally sufficient to provide adequate support for the marine structure. The main piles are connected to the jacket at the top of each jacket leg by welding the pile to the jacket leg before the deck section is set thereon. As the water depth becomes greater, a point is reached where the main piles in the jacket legs are no longer sufficient by themselves to withstand the increasing horizontal shear forces and overturning moments imposed on the structure. Additional support for the marine structure is then required which is usually provided in the form of skirt piles arranged about the base of the structure.

Rather than extending to the top of the jacket, skirt piles are usually truncated at some distance above the mudline of the floor of the body of water upon which the marine structure is located for two primary reasons. First, the skirt piles are not needed for structural integrity of the jacket and, second, additional members, such as skirt piles, extending to the top of the jacket into the wave zone of the jacket will attract more wave forces, thereby increasing the stresses in adjacent members.

Since the connection between the skirt around the jacket and the pile to the skirt is made underwater, the procedures used to make the pile to skirt connection are an important consideration in the overall marine structure design.

The commonly accepted means of connecting the skirt piles to the jacket skirt comprises filling the annulus between the skirt pile and a skirt sleeve, which serves as a pile driving guide, of the jacket skirt with grouting material.

As marine structures are installed in greater depths of water and in more hostile environments, the cost and reliability of the pile to jacket connections become a more important consideration in the design and installation of the marine structure. Depending upon the procedure and equipment utilized, substantial sums can be expended in the grouting of a marine structure. Also, since the grouted connection is difficult to inspect, the quality of the grouted connection cannot be easily determined.

Therefore, based upon the difficulties in utilizing a grouted connection between the pilings and jacket of a marine structure, various alternative methods of forming the connections have been developed.

One such method utilizing a mechanically formed pile-to-jacket connection is described in U.S. Pat. No. 3,555,831 to Pogonowski. As described in Pogonowski, a tool is lowered into the cylindrical casing supporting the drilling platform, which cylindrical casing contains a piling therein. The tool is actuated to form a plurality of swaged, mechanically cold worked connections between the casing and piling. Should a malfunction of the tool occur under some circumstances, it can be retrieved and repaired.

Another such method utilizing a tool permanently secured to the jacket to mechanically grip the piling is described in U.S. Pat. No. 4,052,861 to Malone et al. As described in Malone et al, the tool is inflated to temporarily or permanently grip the piling by means of a plurality of flexible fingers which engage the outer periphery of the piling. However, since the tool is permanently installed, if the tool malfunctions it cannot be retrieved to be repaired. Also, the fatigue life under long term cyclical loading of the connection between the piling and jacket due to the concentrated stresses created by the localized engagement of the outer periphery of the piling by the flexible fingers of the tool is presently unknown and must be empirically estimated.

Yet another method has been utilized by hydraulically actuating a tool to permanently expand the piling into an annular groove in the interior of the jacket leg or pile sleeve of the jacket. While the tool is relatively easy to operate, the swaged connection between the pile and jacket exhibits lowered fracture toughness during loading of the marine structure.

However, in comparison, if a connection between two members can be substantially instantaneously formed using a high energy source, the connection may not exhibit as much fracture toughness sensitivity.

Therefore, the present invention is directed to high energy formed connections, specifically for use in marine structures but applicable to any situation where a reliable connection between two tubular members is desired.

It is well known in the art to use the application of substantially instantaneous high amounts of energy, such as the use of an explosive, to bond one metal to another base metal. For example, such techniques are described in U.S. Pat. Nos. 3,137,937; 3,140,537 and 3,264,731.

It is also well known in the art to use the application of substantially instantaneous high amounts of energy through the use of explosives to join one tubular member to another tubular member. For example, such techniques are described in U.S. Pat. Nos. 2,367,206; 3,160,949; 3,432,192; 3,572,768 and 3,661,004.

It is further well known in the art to use the application of substantially instantaneous high amounts of energy through the use of explosives to join one tubular member to another utilizing a backup member to contain the deformation of the tubular members. For example, such techniques are described in U.S. Pat. Nos. 2,779,279; 3,206,845; 3,263,323; 3,434,194 and 3,710,434.

It is yet further well known in the art to join one tubular member to another through the use of the application of substantially instantaneous high amounts of energy through the use of explosives in the laying of marine pipelines. For example, such a technique is described in U.S. Pat. No. 3,720,069.

It is still yet further well known in the art to join one tubular member to another underground by the use of high amounts of energy through the use of explosives by firing projectiles from the interior of one tubular member through the wall thereof into and through the wall of the other tubular member while forming outwardly extending anchoring bumps in the walls of the tubular members. For example, such a technique is described in U.S. Pat. No. 4,123,913.

In contrast to these prior art techniques, the present invention comprises a method and apparatus for the joining of one tubular member to another tubular member through the use of the substantially instantaneous application of high energy to the tubular members, such as by the use of explosives, while placing one tubular member in a state of substantially elastic deformation and the other tubular member in a state of substantially plastic and elastic deformation.

The benefits of the foregoing invention will be more readily understood from the following specification taken in conjunction with the following drawings wherein.

Figure 1:
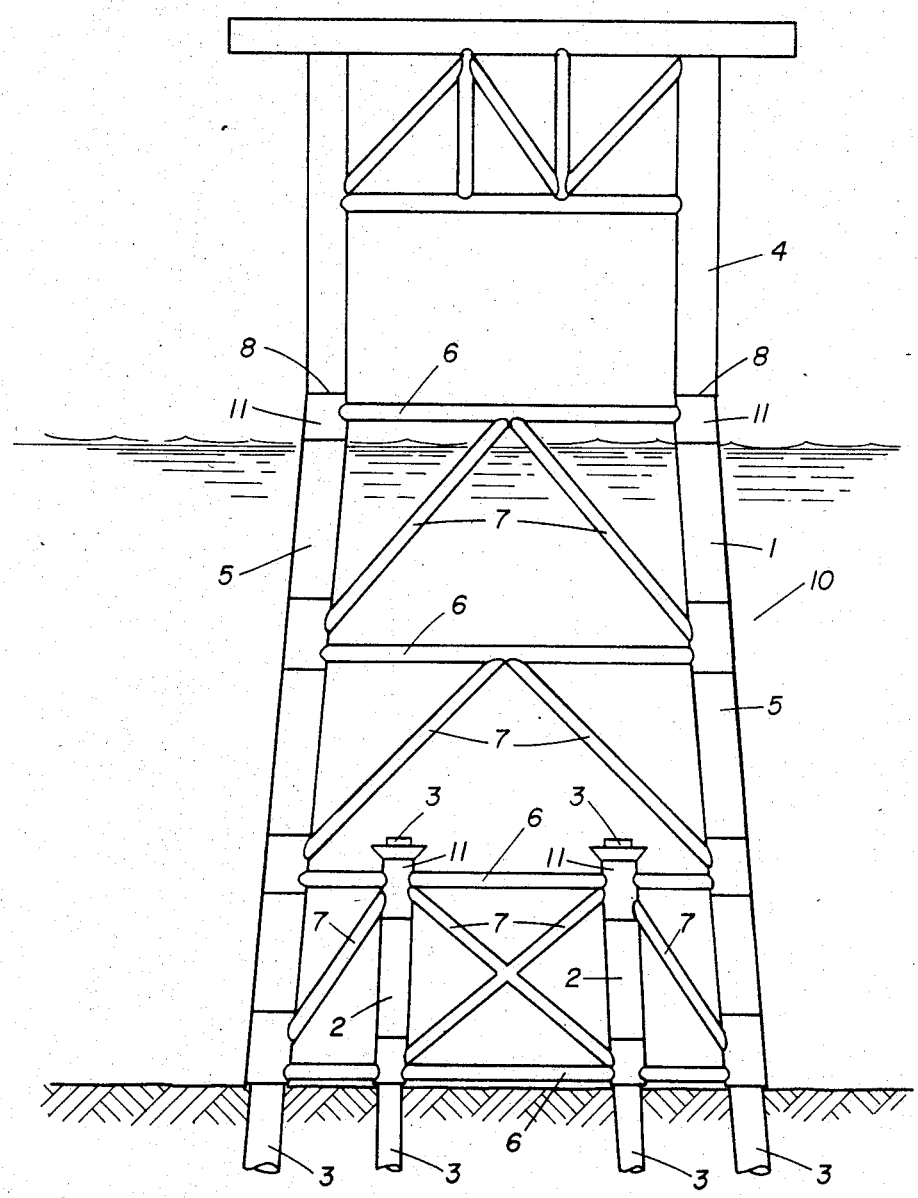
FIG. 1 is a view of a marine structure.

Referring to FIG. 1, a marine structure 10 is shown. The marine structure 10 comprises a jacket 1 having skirt pile sleeves 2 thereon, piles 3 driven through the jacket into the earth, and a deck 4 installed on the jacket 1 above the surface of the body of water in which the marine structure 10 is installed.

The jacket 1 comprises a plurality of jacket legs 5, each having a pile 3 driven therethrough into the earth, interconnected by a plurality of horizontal braces 6 which are also interconnected by a plurality of angular braces 7.

The skirt pile sleeves 2 comprise tubular members secured to the jacket 1 by means of horizontal brace 6 and angular brace 7. The skirt pile sleeves 2 each have a pile 3 driven therethrough into the earth.

The deck 4 is secured to the tops 8 of the jacket legs 5, such as by welding, to form the marine structure.

As shown in FIG. 1, the marine structure 10 may be of any design with the structure shown being merely illustrative.

Figure 2:
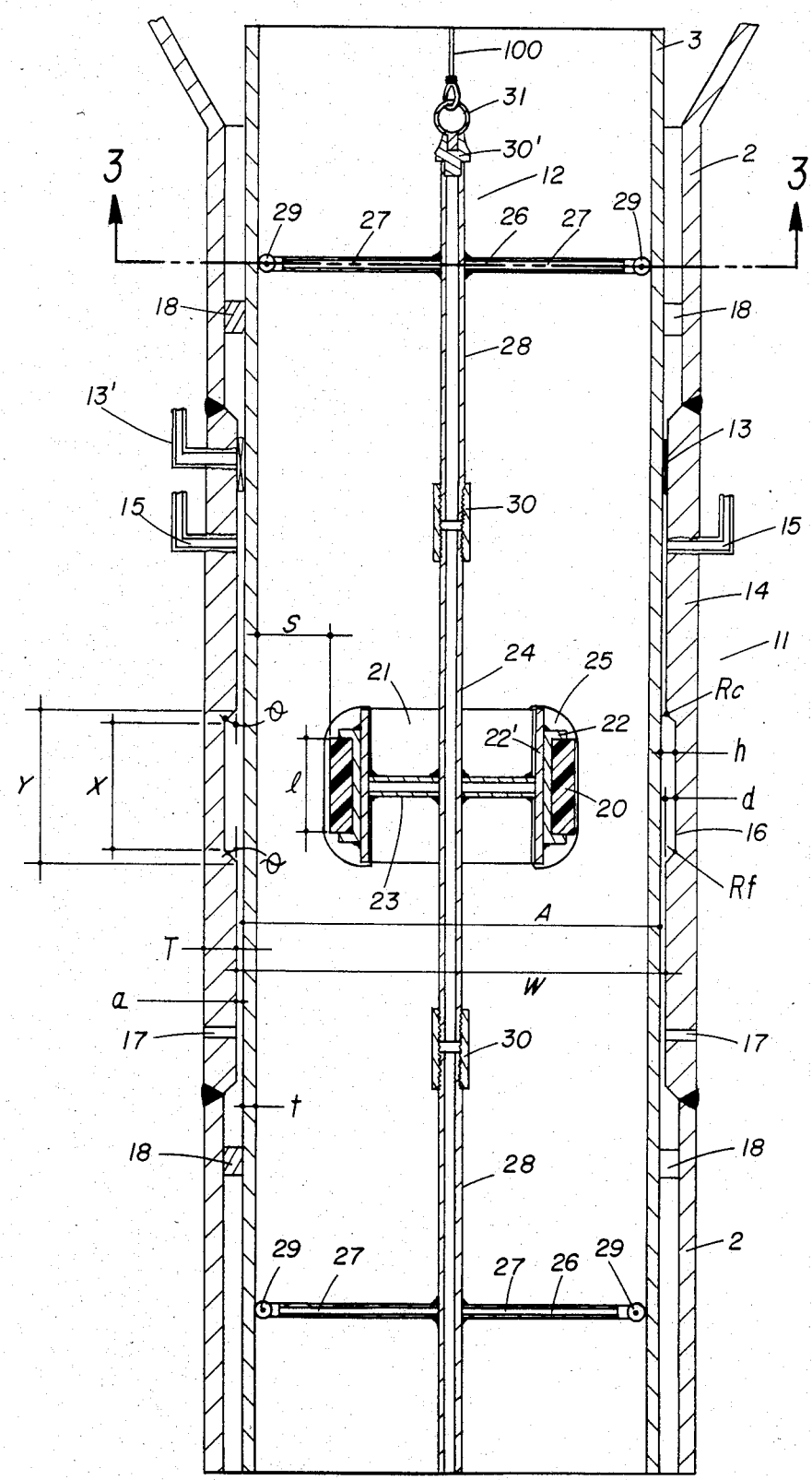
FIG. 2 is a cross-sectional view of the first preferred embodiment of the present invention.

Referring to FIG. 2, the first preferred embodiment of the present invention is shown in relationship to a skirt pile sleeve 2 having a pile 3 driven therethrough of the marine structure 10.

The invention comprises a tubular member or can 11, explosive carrier member 12, seal means 13 and inlet port 13'.

As shown, the tubular member or can 11 comprises a heavy walled or thick tubular member 14 having inlet port means 15 in the upper portion thereof, having circumferential annular groove or socket 16 in the interior thereof, and having outlet port means 17 on the lower portion thereof.

As shown in FIG. 2, the tubular member 11 further contains a seal means 13 on the interior surface thereof to sealingly engage the pile 3 driven therethrough. The seal means 13 may be any commercially available seal means capable of forming a reliable seal with the pile 3 after the pile 3 has been driven therethrough. The seal means 13 may, alternately, be located above the tubular member 11 at any convenient location. Examples of suitable seal means 13 which may be utilized are described in U.S. Pat. Nos. 3,468,132 and 4,047,391.

The tubular member 11 may be secured at any point in either the jacket legs 5 or skirt pile sleeves 2, although it is preferred that they be installed at the intersection of the horizontal 6 and angular 7 braces with the jacket legs 5 and skirt pile sleeves 2.

Also shown in FIG. 2 located on either side of the tubular member 11 are centralizer means 18 which are used to center the pile 3 in the skirt pile sleeve 2.

The explosive carrier member 12 as shown in FIG. 2 comprises a generally annular explosive charge 20 secured to carrier member 21. The generally annular explosive charge 20 is secured within arcuate annular channel members 22 which are, in turn, secured to outer annular member 22' of annular explosive charge carrier 21. The outer annular member 22' is retained on central mandrel 24 of the annular explosive charge carrier 21 by means of struts 23. The struts 23 may be of any convenient cross-sectional shape and of any type material sufficient to support the explosive charge 20.

Typically, the explosive charge 20 is toroidal in configuration and is installed on the explosive carrier member 12 by attaching means 25.

The explosive carrier member 12 further comprises centralizer means 26 located on either side of the explosive charge 20. The centralizer means 26 may be of any convenient type, although a plurality of radial struts 27 connected to a central member 28 having wheels 29 thereon are preferred.

The centralizer means 26 are secured to the central mandrel 24 of the explosive charge carrier 21 by any convenient easily releasable means, such as a threaded coupling 30.

The explosive carrier member 12 additionally comprises plug and lifting means 30' and 31 respectively to provide a means by which a line 100 can be attached to the explosive carrier member 12 to position the explosive carrier member in a jacket leg 5 or skirt pile sleeve 2.

Not shown in FIG. 2 but also included on the explosive carrier member 12 is an indicator means, such as a commercially available ultrasonic indicator, to locate the tubular member 11 to position the explosive charge carrier member 12 within the pile 3 in the proper position substantially centered about the annular groove 16 in the tubular member 11.

Also not shown in FIG. 2 but well known in the art, the explosive charge carrier member 12 contains a suitable detonation means having suitable actuation means to initiate the explosion in the explosive charge means 20.

Figure 3:
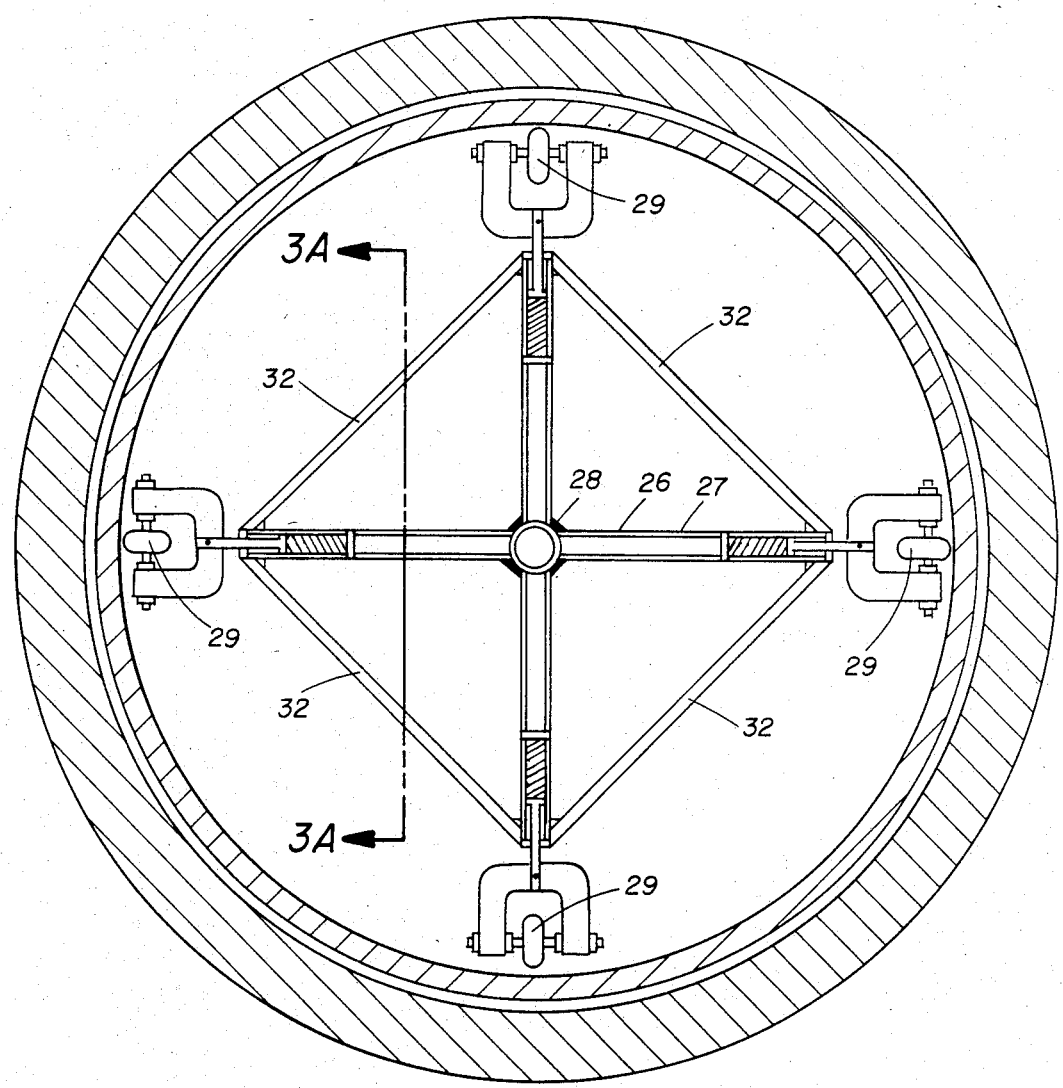
FIG. 3 is a cross-sectional view of FIG. 2 taken along lines 3—3 thereof.

Referring to FIG. 3, the centralizer means 26 is shown. The centralizer means 26 comprises a plurality of radial struts 27 secured to a central member 28 and interconnected about their outer ends by brace means 32.

Figure 3A:
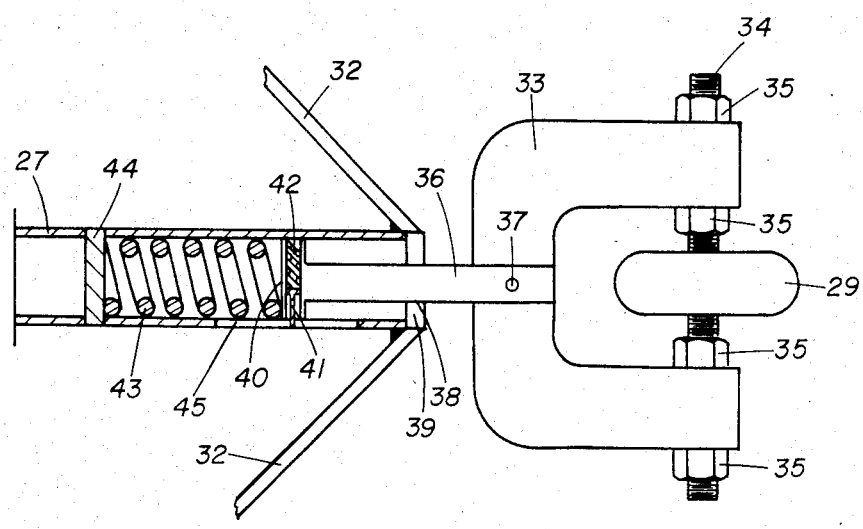
FIG. 3A is an enlarged cross-sectional view of FIG. 3 taken along lines 3A—3A thereof.

Referring to FIG. 3A, the details of the wheel means 29 and its interconnection with the centralizer means 26 can be seen. The wheel means 29 is retained on the U-shaped member 33 by pin means 34 having retaining means 35 thereon. The U-shaped member 33 is secured to rod means 36 by pin means 37. The rod means 36, in turn, passes through bore 38 in the end 39 of strut 27 and has tubular member means 40 having spring actuated pin means 41 and spring means 42 thereon. The tubular member means 40 on rod means 36 is biased outwardly by means of wheel spring means 43 retained within strut 27 having one end thereof bearing against strut plug means 44 while the other end bears against tubular member means 40. To prevent the wheel means 29 from rotating about the axis of rod means 36 when the centralizer means 26 engages the inner surface of the skirt pile sleeve 2 or jacket leg 5, the pin means 41 engages slot means 45 in strut 27 and slides therein.

When the centralizer means 26 engages the inner surface of the skirt pile sleeve 2 or jacket leg 5 when the explosive carrier member 12 is being lowered therein, the wheel means 29 of the centralizer means 26 are biased into engagement with the skirt pile sleeve 2 or jacket leg 5 by spring means 43.

It should be noted that although the centralizer means 26 described herein is preferred to center the explosive charge carrier 21 in the skirt pile sleeve 2 or jacket leg 5, any suitable centralizer means may be utilized.

Referring again to FIG. 2, the procedure for determining the various relationships between the tubular member 11, explosive carrier member 12 and the pile 3 will be discussed.

The internal diameter "W" of the heavy walled tubular member 14 is determined by taking the outside diameter "A" of the pile 3 and adding to that dimension twice the annular space "a" between the internal surface of the tubular member 14 and the external surface of the pile 3. It should be noted that the outside diameter of the pile 3 will be determined by the pile driving and operational loading upon the pile. Similarly, it should be noted that the annular space "a" between the tubular member 14 and pile 3 will be determined by the minimum clearance required between the tubular member 14 and pile 3 to facilitate the driving of the pile 3 through the tubular member 14. Also, the thickness "t" of the pile wall will be determined by the pile driving and operational loading upon the pile 3.

The bulge height "h," the distance between the outside surface of the unexpanded pile 3 and the bottom of the annular groove 16 is preferably in the range of $0.02A \leq h \leq 0.25A$, more preferably in the range of $0.04A \leq h \leq 0.16A$ and most preferably in the range of $0.08A \leq h \leq 0.12A$. The bulge height "h" must be greater than the annular space "a."

The depth of the annular groove 16 in the heavy walled tubular member 14, which is the distance "d" between the internal surface of the tubular member 14 and the bottom of the annular groove 16, is calculated by the equation:

$$d = h - a$$

The thickness "T" of the tubular member 14 is determined after the dimension "d" has been calculated based upon the loading of the tubular member 14. However, the thickness "T" of the tubular member 14 should preferably be in the range of $10 \leq W/T \leq 40$ and more preferably in the range of $30 \leq W/T \leq 35$.

The length "Y" of the annular groove 16 along the internal surface of the tubular member 14 is determined by the general equation:

$$0 \leq Y \leq 2\left(\frac{3\pi}{4\beta}\right)$$

where: $\beta = \left[\frac{12(1-\nu^2)}{A^2 t^2}\right]^{\frac{1}{4}}$ and $\nu$ is Poisson's ratio. Poisson's ratio for steel is 0.27; therefore, the general equation for groove length "Y" when the material of tubular member 14 is steel, reduces to the equation:

$$0 \leq Y \leq 2\left(1.83\sqrt{\frac{At}{2}}\right)$$

The preferred values of "Y" are values which occur in the range of from about $3\pi/4\beta$ to about $1.5\pi/\beta$. For steel, the preferred values reduce to values in the range of from about $1.29\sqrt{At}$ to about $2.58\sqrt{At}$.

The length "X" along the bottom of the annular groove 16 in the tubular member 14 is determined by the angle $\theta$ which is the groove wall angle. The groove wall angle $\theta$ is preferably in the range of 0° to 90°, more preferably in the range of 5° to 60° and most preferably in the range of 20° to 45°. If the groove angle $\theta$ is small, such as $0 \leq \theta \leq 7.5°$, the high energy formed connection is flexible and tends to yield. However, if the groove angle $\theta$ is large, such as $60° \leq \theta \leq 90°$, the pile may split upon the formation of the high energy formed connection.

The corner radius "$R_c$" at the intersection of the shoulder of the annular groove and the internal surface of the tubular member 14 should preferably be in the range of $0.5 \leq R_c/t \leq 16$ and more preferably be in the range of $R_c \approx t$.

Similarly, the radius "$R_f$", the fillet radius at the intersection of the shoulder of the annular groove 16 and the bottom of the annular groove 16 should be equal to the radius "$R_c$".

Of the radii "$R_c$" and "$R_f$", the radius "$R_c$" is more critical since if it is too small, the pile 3 may fracture upon forming the high energy connection between the pile 3 and tubular member 14.

Finally, the number of annular grooves 16 required to carry the load placed upon the pile 3 is a function of the permissible load "L" per groove which is defined by the equation:

$$L = \frac{[f_y t^2 \pi A \theta]}{d}\left(\frac{1}{2}\sin\theta\right)$$

where $f_y$ is the yield strength of the pile material.

The permissible load "L" per annular groove 16 can be optimized by varying the distance "d", the depth of the annular groove 16 in the tubular member 14, and $\theta$, the groove angle. It should be remembered that "A" and "t" were previously determined by the pile driving and operational loading upon the pile.

The number of annular grooves 16 required to transfer the operational loading to the pile 3 is determined by dividing the required operational loading of the pile 3 by the permissible loading "L" of each annular groove 16. If it is determined that more than one annular groove, 16, is required per pile, then the distance between immediately adjacent grooves, "groove separation," should not be less than about one-fourth of the groove length, i.e., 0.25Y. It is believed that a groove separation of less than about one-fourth of groove length (0.25Y) may cause the pile to buckle between adjacent grooves upon loading. In a more preferred embodiment, the groove separation is equal to groove length, Y.

The charge standoff distance "S", the distance between the outer surface of the explosive charge 20 and the internal surface of the unexpanded pile 3 can be equal to one-fifth (1/5) of the internal pile diameter or, alternately, $$S = \frac{A - 2t}{5}$$

The explosive charge 20 should not contact the internal surface of the unexpanded pile 3, because undesired damage to the pile, such as spalling and fracturing, could occur upon detonation of the charge. Thus, charge standoff "S" is greater than 0. Where "S" approaches 0, a buffer such as an elastomer, may be placed between the explosive charge 20 and the internal surface of pile 3.

Since explosive charge 20 may be in a concentrated form, such as a line charge or a spherical charge, charge standoff distance "S" may approach a dimension equal to the inside radius of pile 3, e.g.

$$S < \frac{A - 2t}{2}.$$

Such concentration charges are not desired, because bulge-forming efficiency decreases as standoff distance increases.

It is thus preferred that charge standoff distance "S" be in the range of from about $$\frac{A - 2t}{5}$$

to about $$\frac{A - 2t}{3}.$$

The length "l" of the surface of the explosive charge 20 is in the range of from about 0.25Y to about 1.33Y, preferably about 0.625Y. When the value for charge standoff distance "S" is small, the value for explosive length "l" is large. Thus, when "S" is at its minimum, "l" is equal to about 1.33Y.

The weight and geometry of explosive charge 20 can be calculated separately.

Figure 4:
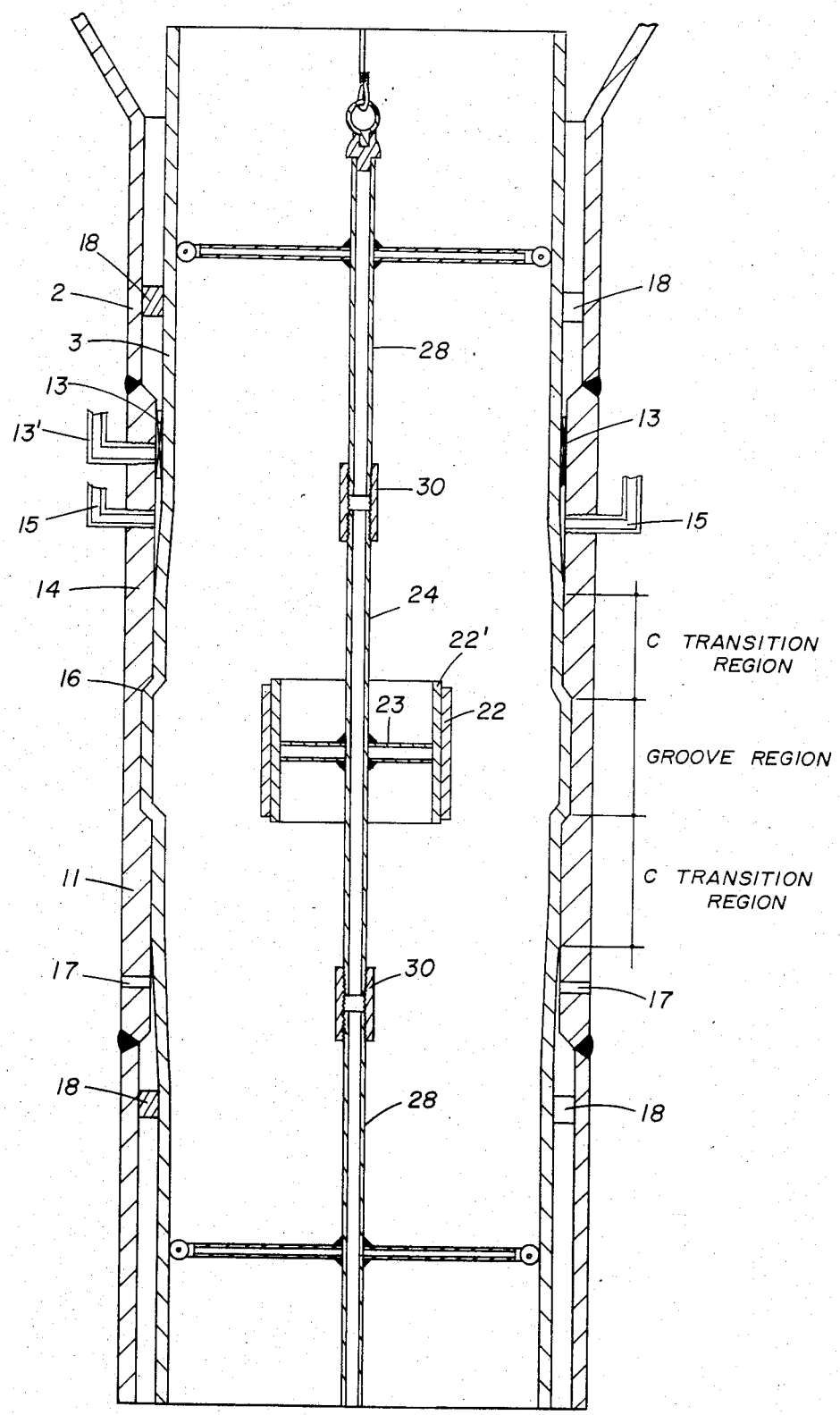
FIG. 4 is a cross-sectional view of the first preferred embodiment of the present invention after the actuation thereof.

The estimation of total deformation energy, "$E_D$", required to form the plastic-elastic connection of this invention is based on a consideration of the final connection geometry, which, referring to FIG. 4, is characterized as consisting of a groove region and two transition regions. In FIG. 4, the exterior surface of pile 3 is shown after deformation to be pressed against the interior surface of tubular member 14 for some distance in "transition regions" on both sides of annular groove 16. The pile in the "groove region" is shown to be crimped tightly over the outside corners of groove 16 and pressed against the center portion of groove 16.

The equation for calculation of total deformation energy, "$E_D$", is, therefore, $$E_D = E_{D1} + E_{D2} + E_{D3}$$

wherein: $E_{D1}$ is the energy required to expand or "bulge" the pile into the groove region; $E_{D2}$ is the energy required to expand the outside diameter of pile 3 to the inside diameter of tubular member 14 in the transition regions; and $E_{D3}$ is the residual strain energy in the tubular member 14.

The deformation energy equations set out below are taken from a general expression given in FIG. 2-48, page 65 of Bruno, E. J., Editor, *High Velocity Forming of Metals*, American Society of Tool and Manufacturing Engineers, Dearborn, Mich., 1968.

The equations for $E_{D1}$, $E_{D2}$ and $E_{D3}$ are set out below:

$$E_{D1} = (2\pi r_2)(Y)(t)(Q)$$

$$E_{D2} = (2\pi r_3)(2C)(t)(Q)$$

$$E_{D3} = (2\pi r_5)(Y)(T - d)(Q)$$

wherein:

"Y" is the groove length of annular groove 16, previously defined (See FIG. 2);

"t" is the wall thickness of pile 3, previously defined (See FIG. 2);

"Q" is the general, expression $$\left(\frac{K}{n+1}\right)(e^{-0.9\epsilon})(\epsilon^{n+1});$$

"C" is the length of the transition region, previously defined (See FIG. 4);

"T" is the thickness of the heavy walled tubular member 14, previously defined (See FIG. 2);

"d" is the depth of annular groove 16, previously defined (See FIG. 2);

"$r_1$" is the unexpanded inside radius of pile 3 which is defined as $$\frac{A - 2t}{2}$$

(See FIG. 2);

"$r_2$" is the expanded inside radius of pile 3 in the groove region which is defined as $r_1 + h$ (See FIG. 2);

"$r_3$" is the expanded inside radius of pile 3 in the transition regions, which is defined as $r_1 + a$ (See FIG. 2);

"$r_4$" is the unexpanded inside radius of tubular member 14 in the groove region, which is defined as $r_1 + t + h$ (See FIG. 2); and "$r_5$" is the expanded inside radius of tubular member 14 in the groove region, which is defined as $r_4+k$.

The terms of the general equation $$"Q" = \left(\frac{K}{n+1}\right)(e^{-0.9\epsilon})(\epsilon^{n+1})$$

are defined as follows:

"K" and "n" are material constants in the flow stress power law relating true stress to true strain wherein $\sigma = K\epsilon^n$. Values for "K" and "n" can be found in Table 3.1, page 69 of Ezra, A. A., *Principles and Practice of Explosive Metalworking*, Volume I, Industrial Newspapers Ltd., London, 1973. For steel values of "K" and "n" which can be used herein for estimating purposes are 100,000 psi and 0.24, respectively.

The term "$\epsilon$," appearing in the general equation "Q," is the material strain involved in each of the equations for $E_{D1}$, $E_{D2}$ and $E_{D3}$. Therefore, in accordance with the well known definition for strain, $\epsilon$ is the ratio of the increase in a given radius to the initial value of the given radius. Accordingly, in the equation for $E_{D1}$, the strain factor $\epsilon$ is defined as $h/r_1$; in the equation for $E_{D2}$, the strain factor $\epsilon$ is defined as $a/r_1$; in the equation for $E_{D3}$, the strain factor $\epsilon$ is defined as $k/r_4$.

With respect to $\epsilon$ in the equation for $E_{D3}$, the value for "k," the increase in radius $r_4$, is not defined. Accordingly, in order to assure that tubular member 14 remains in elastic deformation, an allowable average circumferential strain in the groove region in tubular member 14 is specified. The equation for $r_5$ thus reduces to $r_5 = r_4(1+0.02)$. To thus obtain the required elastic deformation, it is believed that $\epsilon$ for $E_{D3}$ can safely be specified to be about 2% (i.e. 0.02 inches/inch).

With respect to the equation for $E_{D2}$, above, the value of "C" cannot be exactly defined for there is no known existing method of predicting the length of metal contact in the transition regions (FIG. 4). However, experimental evidence reveals that the transition region extends less than one pile diameter on either side of the groove region. Accordingly, the value of "C" for estimating purposes is believed to be in the range of from about 50% of the outside diameter of pile 3 to about 100% of the outside diameter of pile 3 and preferably about 75% of the outside diameter of pile 3, i.e. 0.5 "A" to "A"; preferably 0.75 "A".

To calculate the weight "M" of the explosive required to form a single high energy formed connection, the weight "M" is defined as:

$$M = \frac{E_D}{F} \cdot \frac{1}{\text{(Specific Energy of the Explosive Used)}}$$

where F is an estimated forming efficiency from FIG. 2-49 of the *High Velocity Forming of Metals*, American Society of Tools and Manufacturing Engineers, E. J. Bruno, Ed., Dearborn, Mich., 1968.

OPERATION

To form a high energy formed connection between a pile 3 and tubular member 11, the pile 3 is first driven to the desired depth in the floor of the body of water in which the marine structure 10 is installed. The pile 3 is usually, although not necessarily, then truncated to allow the easy insertion of the explosive carrier member 12 therein.

The explosive carrier member 12 is lowered into the pile 3 by a suitable lifting means (not shown), such as a crane on a derrick barge, until the explosive charge 20 is substantially centered about a plane passing through the center of the annular groove 16 in the tubular member 14.

Once the explosive charge 20 is centered about the annular groove 16 in the tubular member 14, the seal means 13 is actuated by introducing compressed air or gas through inlet port 13' to sealingly engage the exterior surface of the pile 3. Next, compressed air or gas is injected through inlet ports 15 in the tubular member 14 to expel the water contained in the annulus between the tubular member 14 and pile 3 through the outlet ports 17 located at the bottom of the tubular member 14. Once the annulus between the tubular member 14 and pile 3 has been substantially evacuated of liquid contained in the area surrounding the annular groove 16, the explosive charge 20 may be detonated thereby causing a high energy formed connection between the tubular member 14 and the pile 3 by the pile 3 being locally plastically deformed into the annular groove 16 in the tubular member 14.

Referring to FIG. 4, the high energy formed connection of the present invention is shown. As shown, the pile 3 has been locally plastically deformed into engagement with the annular groove 16 in the tubular member 14. However, it should be noted that the tubular member 14 is merely in elastic deformation since the explosive charge 20 was sized to merely plastically deform the pile 3 but not the tubular member 14 when the annulus between tubular member 14 and the pile 3 has been substantially evacuated.

It must be noted that it is important to have the annulus between the tubular member 14 and pile 3 substantially free of water so that a compressible medium is present in the annulus between the tubular member 14 and pile 3. Otherwise, the tubular member 14 will be plastically deformed like the pile 3, thereby causing the strength of the high energy formed connection to be less than that of a high energy formed connection in which the tubular member 14 was merely elastically deformed. By carefully designing the tubular member 14 and the judicious selection of ductile material for the tubular member 14 and pile three, as well as the proper size of explosive charge 20 and the substantial evacuation of the annulus between the tubular member 14 and pile 3, the tubular member 14 can be placed in substantially elastic deformation, thereby yielding a stronger high energy formed connection than that of a joint where both the tubular member 14 and pile 3 are plastically deformed with each having a bulge therein after the formation of the connection.

It should be noted that after the formation of a high energy formed connection, the explosive charge carrier 12 is retrieved from the interior of the pile 3 and the charge carrier member 21, arcuate annular channel members 22, outer annular member 22' and central mandrel 24 are replaced with other members having an explosive charge 20 thereon. At this time, the explosive charge carrier 12 is ready to be reused to form another high energy formed connection in another jacket leg 5 or pile sleeve 2.

The explosive charge carrier 12 can be reused any number of times so long as the threaded couplings 30 are not damaged and adequately support and release the central mandrel 24 from central members 28.

It should be noted that, if desired, the portion of the pile sleeve 2 below the tubular member 11 may be deleted since that portion of the pile sleeve serves no purpose other than as the connection point for the horizontal brace 6 and angular brace 7, which may be otherwise connected or deleted depending upon the design of marine structure 10. If the portion of the pile sleeve 2 below the tubular member 11 is deleted, the marine structure is more economical to construct since a lesser amount of material is utilized.

Figure 5:
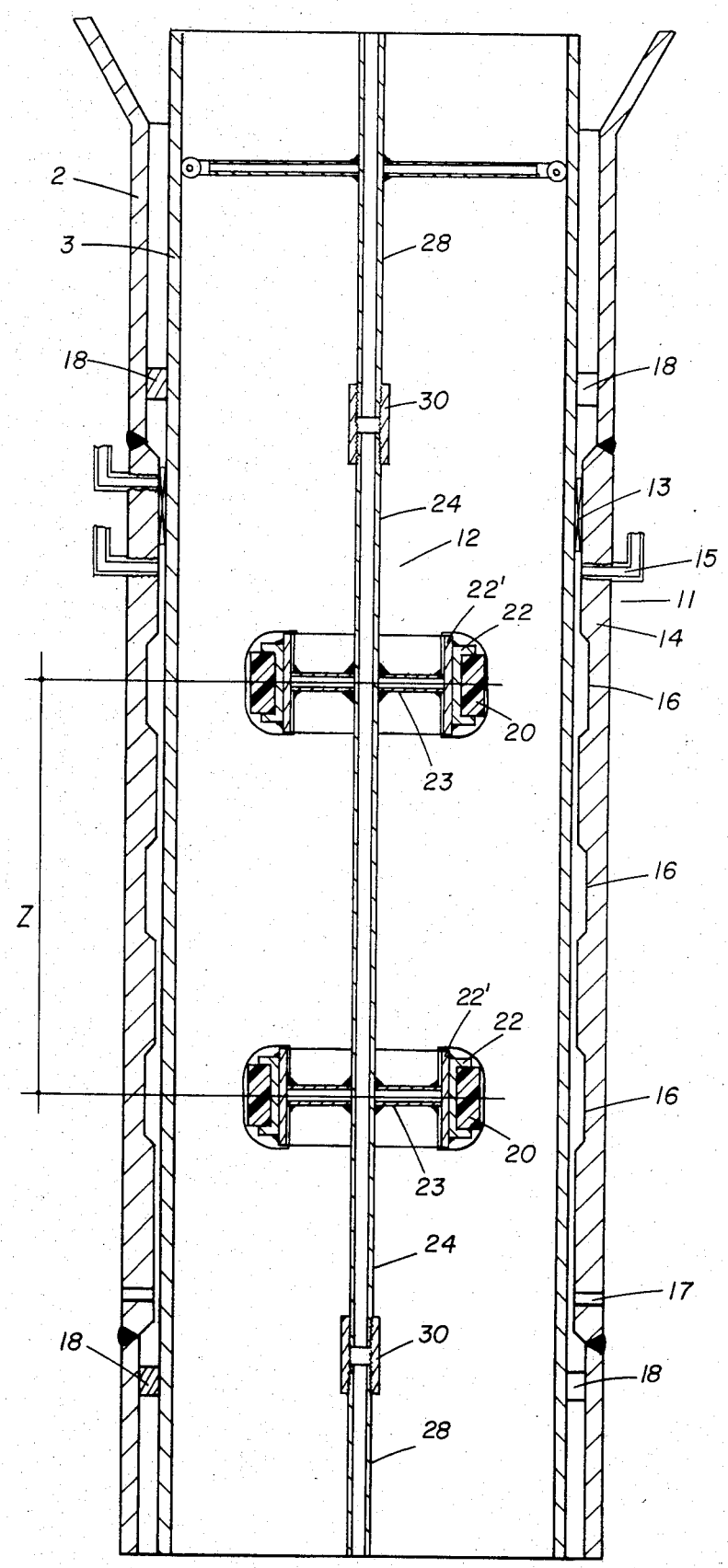
FIG. 5 is a cross-sectional view of a second preferred embodiment of the present invention.

Referring to FIG. 5, a second embodiment of the present invention is shown. In this embodiment of the present invention, three high energy formed connections can be made between the tubular member 14 and pile 3 by means of an explosive carrier member 12 containing two explosive charges 20 thereon.

The various dimensions of the pile 3, tubular member 14 and explosive charges 20 are calculated as if only one high energy formed connection were to be made between the pile 3 and tubular member 14 by each explosive charge 20.

However, when two explosive charges 20 are used, if careful attention and consideration are given to the location of the annular grooves 16 in the tubular member 14, three high energy formed connections between the tubular member 14 and pile 3 can be formed utilizing only two explosive charges 20.

To form three high energy formed connections utilizing only two explosive charges 20 on the explosive charge carrier 12, the two explosive charges 20 must be substantially centered about planes passing through the centers of the outer two annular grooves 16 in the tubular member 14 and the distance "Z" between the center of the two outer grooves 16 can be substantially equal to the external diameter "A" of the pile 3. The distance between the center of two adjacent grooves is substantially equal to A/2 and the groove length "Y" should preferably not be less than A/4.

Upon substantially simultaneous detonation of the explosive charges 20, the pile 3 is deformed into the outer annular grooves 16 in the tubular member 14 by the shock waves from the explosive charges 20 while the pile 3 is deformed into the center annular groove 16 in the tubular member 14 by the combined effect of the shock waves from the explosive charges 20. The combined effect of the shock waves from the explosive charges 20 is a shock wave whose pressure can range from two to eight times the pressure from a single explosive charge 20, depending upon the proximity of the explosive charges 20 on the explosive charge carrier 12.

The spacing of the explosive charges 20 on the explosive charge carrier 12 is critical to prevent the plastic deformation of the tubular member 14 in the vicinity of the center annular groove 16. Should the distance "Z" between the outer annular grooves 16 be substantially less than the external diameter "A" of the pile 3, the combined effect of the shock waves emanating from the explosive charges 20 will be sufficiently great to cause the plastic deformation of not only the pile 3 but also the tubular member 14 in the vicinity of the center of annular groove 16. As previously discussed, if the high energy formed connection results in the plastic deformation of both the tubular member 14 and pile 3, at the minimum, a connection is formed whose fatigue life is less than that of a plastic-elastic connection and, at the worst, if the plastic deformation is too great, either or both the tubular member 14 and pile 3 may be cracked or split.

From the foregoing, it can be easily seen that although the present invention has been described with respect to forming high energy formed connections between either the pile and skirt pile sleeve or the pile and jacket leg of a marine structure, the present invention can be used to join any two tubular members in either atmospheric conditions or liquid environments.

It should also be readily apparent from the foregoing that it is important to have the pile (inner tubular member) substantially centered in either the skirt pile sleeve or jacket leg (outer tubular member); otherwise, the high energy formed connection will not be uniform about the skirt pile sleeve or jacket leg. However, if the pile is offset in either the skirt pile sleeve or the jacket leg, a high energy formed connection can be formed by merely offsetting the location of the explosive carrier member within either the skirt pile sleeve or jacket leg to compensate for the eccentricity of the pile within either the skirt pile sleeve or jacket leg.

It should be readily apparent from the foregoing that it is important to have the explosive charges substantially centered about a plane passing through the center of the annular groove in the tubular member secured to the jacket leg or skirt pile sleeve; otherwise, the high energy formed connection will not be satisfactorily formed.

As previously recited, the annulus between the pile and the tubular member secured to either the jacket leg or skirt pile sleeve should be substantially free of liquid or a compressible medium should be present in the annulus in the area where the high energy formed connections are to be made. Otherwise, the high energy formed connections will result in the tubular member being plastically deformed rather than merely being substantially elastically deformed.

Additionally, it should be further understood that the tubular member containing the annular grooves into which the pile is to be deformed must be of sufficiently ductile material to permit the elastic deformation thereof during the high energy forming process.

In reviewing the present invention described hereinbefore in the light of the prior art methods of forming connections between two tubular members, particularly tubular members of a marine structure, it can be easily seen that the present invention offers the following advantages.

The present invention eliminates the need for the grouting of the annulus between either the jacket leg or skirt pile sleeve of a marine structure and the pile contained therein to support the structure, thereby eliminating the cost of grouting material.

The present invention is simple and economical to construct and simple to use.

The present invention does not plastically deform both members of the high energy formed connection, thereby causing undesirable properties in the metal at the connection points.

The present invention does not cause highly concentrated stresses over very small areas of the members forming the high energy formed connection, thereby facilitating the accurate mathematic prediction of the fatigue life of the connection under long-term cyclic loading.

The explosive charge carrier 12 of the present invention can be easily removed from the members involved in the high energy formed connection prior to detonation should a malfunction occur.

The present invention does not require the use of a backup anvil on the exterior of the outer tubular member of the high energy formed connection to prevent the plastic deformation thereof during the connection forming process.

This invention is not limited to the above described specific embodiments thereof; it must be understood therefore that the detail involved in the descriptions of the specific embodiments is presented for the purpose of illustration only, and that reasonable variations and modifications, which will be apparent to those skilled in the art, can be made in this invention without departing from the spirit or scope thereof.

Having thus described the invention, that which is claimed is:

1. A method for connection of two conduits in a liquid environment, comprising;
    placing a first conduit in the interior of a second, larger conduit;
    removing a liquid from between said first and second conduits in the vicinity where said connection is to be made;
    deforming said first conduit outwardly with a high energy source into contact with the inside wall of said second conduit, whereby a connection between said conduits is made.

2. The method of claim 1, wherein said first and second conduits are coaxial.

3. The method fo claim 1, wherein said high energy source is placed at the longitudinal location of the desired connection.

4. The method of claim 1, wherein said liquid environment is an aqueous environment.

5. A method of connecting two submerged tubular elements, comprising:
    placing a first tubular element in said second tubular element;
    removing any liquid from between said first and second tubular elements;
    explosively plastically deforming said first tubular element outwardly into contact with said second tubular element.

6. The method of claim 5, wherein said second tubular element is placed in a state of elastic deformation.

7. The method of claim 5, wherein both of said tubular elements are metallic.

8. A method of connecting a water-filled pile and jacket leg on a marine structure, comprising:
    placing said pile inside said jacket leg;
    creating a seal in the annulus between said pile and said jacket leg above the connecting location;
    expelling water from said annulus below said seal with air pressure;
    introducing an explosive charge into said pile at said connecting location, the annulus proximate said explosive charge being substantially water free;
    detonating said explosive charge to plastically deform said pile into contact with said jacket leg.

9. The method of claim 8, wherein said jacket leg is elastically deformed by said contact of said pile with its inner surface.

10. The method of claim 8, wherein said pile and said jacket leg are oriented at an angle other than the horizontal.

11. The method of claim 8, wherein the outer wall of said pile does not contact the inner wall of said jacket in the vicinity of said connecting location.

12. A method of making a substantially rigid connection between submerged conduits comprising:
    forming a telescoped pair of conduits by introducing a first conduit into the interior of a second conduit;
    removing substantially all water from between said conduits in the vicinity where said substantially rigid connection is to be made; and
    explosively forming a permanent bulge in said first conduit, said bulge being sufficient to cause a portion of the outside surface of said first conduit to contact the inside surface of said second conduit to thereby make a substantially rigid connection between said first conduit and said second conduit, said forming of said bulge being effected by the substantially instantaneous radial expansion of said first conduit.

13. A method of making a substantially rigid connection between conduits in an aqueous environment comprising:
    introducing a first conduit into the interior of a second conduit, there existing an annular space between the outside surface of said first conduit and the inside surface of said second conduit;
    removing substantially all water from said annular space at the location wherein said rigid connection is to be made;
    introducing a high energy source into interior of said first conduit;
    actuating said high energy source to release sufficient energy within said interior of said first conduit to substantially instantaneously radially expand a portion of said first conduit by an amount sufficient to form a permanent bulge in said first conduit to contact the inside surface of said second conduit, whereby a substantially rigid connection is made between said first conduit and said second conduit.

14. A method of making a substantially rigid connection between conduits submerged in water comprising:
    selecting a first conduit and a second conduit, said second conduit having at least one circumferential groove formed in the inside surface thereof, said groove having a bottom surface, a first end surface and a second end surface;
    introducing said first conduit into the interior of said second conduit by an amount at least sufficient to locate at least a portion of the outside surface of said first conduit opposite said groove, said longitudinal axis of said first conduit being substantially parallel to the longitudinal axis of said second conduit, there being an annular space between the outside surface of said first conduit and the inside surface of said second conduit, said annular space including said groove;
    removing substantially all water from said annular space proximate said groove;
    positioning a high energy source in the interior of said first conduit substantially within a plane passing through said groove;
    actuating said high energy source whereby sufficient energy is released within said interior of said first conduit to substantially instantaneously radially expand at least said portion of said first conduit opposite said groove by an amount sufficient to form a permanent bulge in said first conduit, said bulge being sufficient to cause at least said portion of said outside surface of said first conduit opposite said groove to occupy said groove and to contact said bottom surface thereof to thereby make a substantially rigid connection between said first conduit and said second conduit.

15. A method of making a substantially rigid connection between tubular members having circular cross-sections comprising:

selecting a first tubular member and a second tubular member;

forming at least one groove in the inside surface of said second tubular member, said groove being substantially centered on a plane perpendicular to the longitudinal axis of said second tubular member and passing through the walls thereof, and having a bottom surface substantially parallel to said inside surface of said second tubular member, a first end surface and a second end surface;

introducing said first tubular member into the interior of said second tubular member by an amount sufficient to penetrate said plane passing through said walls of said second tubular member, whereby a portion of the outside surface of said first tubular member is opposite said groove and wherein the longitudinal axis of said first tubular member is substantially coincident with the longitudinal axis of said second tubular member, thereby forming an annular space between the outside surface of said first tubular member and the inside surface of said second tubular member, said annular space including said groove;

removing substantially all water from said annular space in the vicinity of said groove;

introducing an explosive means into the interior of said first tubular member and positioning said explosive means in the interior of said first tubular member such that said explosive means is substantially centered on said plane passing through said walls of said second tubular member and on said longitudinal axis of said first tubular member;

detonating said explosive means whereby sufficient energy is released within said interior of said first tubular member to substantially instantaneously radially expand the walls of said first tubular member opposite said groove by an amount sufficient to form a permanent bulge in said walls, said bulge being sufficiently large to cause said outside surface of said first tubular member opposite said groove to occupy said groove and to contact said bottom surface thereof to thereby make a substantially rigid connection between said first tubular member and said second tubular member.

16. The method of claim 15 wherein at least one of said tubular members is of a ductile material.

17. The method of claim 15 wherein the width of said groove, as measured from the intersection of said first end surface with said inside surface of said second tubular member to the intersection of said second end surface with said inside surface of said second tubular member and along a line parallel to said longitudinal axis of said second tubular member, is equal to a distance in the range of from about 0 to about $2(3\pi/4\beta)$ wherein:

$$\beta = \left[ \frac{12(1 - v^2)}{A^2 t^2} \right]^{\frac{1}{4}}$$

$v$ = Poisson's ratio
$A$ = the outside diameter of the first tubular member
$t$ = wall thickness of said first tubular member.

18. The method of claim 15 wherein the groove angle between said first end surface and said inside surface of said second tubular member is in the range of from about 0° to about 90° and the groove angle between said second end surface and said inside surface is in the range of from about 0° to about 90°.

19. The method of claim 15 wherein said radial expansion of said first tubular member is equal to a distance greater than about the depth of said annular space to a distance of about one-fourth of said outside diameter of said first tubular member.

20. The method of claim 15 wherein said explosive means is substantially toroidal in shape.

21. The method of claim 17 wherein at least two grooves are formed in said inside surface of said second tubular member and the spacing between said grooves is at least about one-fourth of said groove width.

22. The method of claim 15 wherein the intersection of said first end surface with said inside surface of said second tubular member is defined by the expression $$0.5 \leq R_c/t \leq 16$$

wherein:
$R_c$ = the radius of said intersection
$t$ = the thickness of the wall of said first tubular member.

23. The method of claim 16 wherein the maximum load which each groove can be subjected to is defined by the expression:

$$\left[ L = \frac{(f_y t^2 \pi A \theta)}{d} \right] [(\frac{1}{2} \sine \theta)]$$

wherein:
$L$ = maximum load per groove
$f_y$ = yield strength of the material of said first tubular member
$t$ = wall thickness of said first tubular member
$\pi$ = pi
$A$ = outside diameter of said first tubular member
$\theta$ = said groove angle
$d$ = perpendicular distance from said bottom surface of said groove to said inside surface of said second tubular member.

24. The method of claim 16 wherein said radial expansion of said first tubular member is equal to a distance greater than about the depth of said annular space to a distance of about one-fourth of said outside diameter of said first tubular member.

25. A method for making a substantially rigid connection in an aqueous environment between tubular members having circular cross-sections comprising:

selecting a first tubular member and a second tubular member;

forming at least three grooves in the wall of the inside surface of said second tubular member wherein said at least three grooves include a first end groove, a second end groove and an intermediate groove between said first end groove and said second end groove and further wherein each of said grooves is substantially centered on a plane perpendicular to the longitudinal axis of said second tubular member and each of said grooves having a bottom surface substantially parallel to said inside surface of said second tubular member a first end surface and a second end surface; and still further wherein the distance between each groove is at least about ¼ groove width;

introducing said first tubular member into the interior of said second tubular member by an amount sufficient to penetrate said planes passing through said walls of said second tubular member whereby a portion of the outside surface of said first tubular member is opposite each said groove and wherein the longitudinal axis of said first tubular member is substantially coincident with the longitudinal axis of said second tubular member, an annular space being established between the outside surface of said first tubular member and the inside surface of said second tubular member, said annular space including said at least three grooves;

removing substantially all water from said annular space in the vicinity of said three grooves;

introducing at least two explosive means into the interior of said first tubular member and positioning said explosive means in the interior of said first tubular member such that said explosive means are substantially centered on said planes passing through said walls of said second tubular member and on said longitudinal axis of said first tubular member, wherein one of said two explosive means is centered on said plane passing through said first end groove and one of said two explosive means is centered on said plane passing through said second end groove;

detonating said at least two explosive means substantially simultaneously whereby sufficient energy is released within said interior of said first tubular member to substantially instantaneously radially expand the walls of said first tubular member opposite each of said at least three grooves by an amount sufficient to form at least three permanent bulges in said walls of said first tubular member each of said bulges being sufficiently large to cause said outside surface of said first tubular member opposite each of said groove to occupy said groove and to contact said bottom surface thereof to thereby make a substantially rigid connection between said first tubular member and said second tubular member.

26. An apparatus for the formation of a high energy formed connection between a first tubular member and a portion of a second tubular member contained therein in a liquid environment, said apparatus comprising:

tubular member means having annular groove means in the interior thereof secured to said first tubular member;

explosive carrier means having a smaller external diameter than the internal diameter of said second tubular member and having explosive charge means thereon, said explosive carrier means adapted to be positioned within the interior of said second tubular member;

seal means secured to said first tubular member for sealingly engaging the outer surface of said second tubular member and for thereby defining at least one end of a portion of an annulus between said first and second tubular members, said portion of said annulus extending across said annular groove means;

wherein said tubular member means further includes inlet port means, located on one side of said annular groove means and communicated with said portion of said annulus, for supplying a compressible fluid to said portion of said annulus to thereby force any non-compressible liquid out of said portion of said annulus adjacent said annular groove means;

wherein said tubular member means further includes outlet port means, located on a second side of said annular groove means, and communicated with said portion of said annulus, for allowing said non-compressible liquid to flow out of said portion of said annulus as said portion of said annulus is filled with said compressible fluid; and said apparatus being so arranged and constructed that said non-compressible liquid may be eliminated from said portion of said annulus and replaced with said compressible liquid, prior to the formation of said high energy formed connection between said second tubular member and said first tubular member by the deformation of a portion of said second tubular member into said annular groove means upon detonation of said explosive charge means, thereby preventing plastic deformation of said tubular member means which would otherwise occur if said portion of said annulus were filled with said non-compressible liquid.

27. The apparatus of claim 26 wherein said explosive carrier means comprises:
central mandrel means;
strut means secured to the central mandrel means and extending radially therefrom;
annular carrier means secured to the outer ends of the strut means; and
annular explosive charge means attached to the annular carrier means.

28. The apparatus of claim 27 wherein the annular explosive charge means comprises a plurality of arcuate explosive charge means.

29. The apparatus of claim 26 wherein the annular groove means in said tubular member means comprises a plurality of annular groove means.

30. The apparatus of claim 29 wherein the explosive carrier means comprises:
central mandral means;
first strut means secured to the central mandrel means and extending radially therefrom;
first annular carrier means secured to the outer ends of the first strut means;
first annular explosive charge means attached to the first annular carrier means;
second strut means secured to the central mandrel means and extending radially therefrom;
second annular carrier means secured to the outer ends of the second strut means; and
second annular explosive charge means attached to the second annular carrier means.

31. The apparatus of claim 30 wherein the distance between the center of the first annular explosive charge means and the center of the second annular explosive charge means is substantially equal to the distance between the center of the annular groove means on one end of the plurality of annular groove means and the center of the annular groove means on the other end of the plurality of annular groove means.

32. The apparatus of claim 26 wherein said seal means comprises annular inflatable seal means.

33. The apparatus of claim 26 wherein said first tubular member contains centralizer means therein to center said second tubular member therein.

34. The apparatus of claim 26 wherein said explosive carrier means further comprises:
centralizer means to center said explosive carrier means in said second tubular member.

35. The apparatus of claim 26, wherein:
said first and second tubular members are oriented non-horizontally;
said seal means includes a single seal located above said annular groove means;
said inlet port means is located above said annular groove means and below said single seal; and
said outlet port means is located below said annular groove means.

36. The apparatus of claim 26 wherein:
said first tubular member is a skirt pile sleeve of a marine structure and said second tubular member is a tubular pile driven through said skirt pile sleeve.

37. The apparatus of claim 26 wherein:
said first tubular member is a jacket leg of a marine structure and said second tubular member is a tubular pile driven through said jacket leg.

38. An apparatus for the formation of a high energy formed connection between a first tubular member having a portion of a second tubular member contained therein, said apparatus comprising:
tubular member means having a plurality of annular groove means in the interior thereof secured to said first tubular member;
explosive carrier means having a smaller external diameter than an internal diameter of said second tubular member and having explosive charge means thereon, said explosive carrier means adapted to be positioned within the interior of said second tubular member, whereby said second tubular member is connected to said first tubular member by the detonation of the explosive charge means of said explosive carrier means when said explosive carrier means is positioned in the interior of said second tubular member thereby causing the formation of a high energy formed connection between said second tubular member and said first tubular member by deformation of a portion of said second tubular member into the annular groove means in the interior of said tubular member means secured to said first tubular member, said explosive carrier means including:
central mandrel means;
first strut means secured to the central mandrel means and extending radially therefrom;
first annular carrier means secured to the outer ends of the first strut means;
first annular explosive charge means attached to the first annular carrier means;
second strut means secured to the central mandrel means and extending radially therefrom;
second annular carrier means secured to the outer end of the second strut means;
second annular explosive charge means attached to the second annular carrier means; and
wherein the distance between the center of the first annular explosive charge means and the center of the second annular explosive charge means is substantially equal to the distance between the center of the annular groove means on one end of the plurality of annular groove means and the center of the annular groove means on the other end of the plurality of annular groove means.

39. The apparatus of claim 38 wherein said distance between the centers of the first and second annular explosive charges is not substantially less than an outside diameter of said first tubular member and said plurality of annular grooves are equally spaced.

* * * * *